(12) United States Patent
Moganty et al.

(10) Patent No.: US 10,781,225 B1
(45) Date of Patent: Sep. 22, 2020

(54) MODIFIED IONIC LIQUIDS CONTAINING CYCLIC PHOSPHORUS MOIETY

(71) Applicant: NOHMS Technologies, Inc., Rochester, NY (US)

(72) Inventors: Surya S. Moganty, Henrietta, NY (US); John Sinicropi, Rochester, NY (US); Yue Wu, Rochester, NY (US); David Steele, Webster, NY (US); Gabriel Torres, Rochester, NY (US); Rutvik Vaidya, Rochester, NY (US)

(73) Assignee: NOHMS Technologies, Inc., Rochester, NY (US)

( * ) Notice: Subject to any disclaimer, the term of this patent is extended or adjusted under 35 U.S.C. 154(b) by 0 days.

(21) Appl. No.: 16/824,024

(22) Filed: Mar. 19, 2020

Related U.S. Application Data

(60) Provisional application No. 62/820,609, filed on Mar. 19, 2019.

(51) Int. Cl.
*C07F 9/6584* (2006.01)
*H01M 10/0567* (2010.01)
*H01G 11/62* (2013.01)

(52) U.S. Cl.
CPC ........... *C07F 9/6584* (2013.01); *H01G 11/62* (2013.01); *H01M 10/0567* (2013.01); *H01M 2300/0025* (2013.01)

(58) Field of Classification Search
CPC .. C07F 9/6584; H01G 11/62; H01M 10/0567; H01M 2300/0025
See application file for complete search history.

(56) References Cited

U.S. PATENT DOCUMENTS

| | | |
|---|---|---|
| 2006/0210873 A1 | 9/2006 | Hollenkamp et al. |
| 2010/0118598 A1 | 5/2010 | Hawkins et al. |
| 2011/0039467 A1 | 2/2011 | Xu |
| 2013/0004862 A1 | 1/2013 | Miyoshi et al. |
| 2014/0272607 A1 | 9/2014 | Amine et al. |
| 2017/0288269 A1* | 10/2017 | Moganty ............... H01M 4/525 |

OTHER PUBLICATIONS

International Search Report and Written Opinion for International Application No. PCT/US2020/023547 dated Jun. 22, 2020; 7 pages.
Su, Chi-Cheung, et al., Functionality Selection Principle for High Voltage Lithium-ion Battery Electrolyte Additives, ACS Applied Materials & Interfaces, 2017, pp. 30686-30695.

* cited by examiner

*Primary Examiner* — Carlos Barcena
(74) *Attorney, Agent, or Firm* — Bond, Schoeneck & King, PLLC; Joseph Noto

(57) ABSTRACT

The present disclosure is directed to a phosphorus-modified ionic liquid compound, the synthesis thereof and an electrochemical cell electrolyte containing the cyclic phosphorus-modified ionic liquid compound.

10 Claims, No Drawings

MODIFIED IONIC LIQUIDS CONTAINING CYCLIC PHOSPHORUS MOIETY

CROSS REFERENCE

This application claims the benefit of the filing date of U.S. Provisional Patent Application Ser. No. 62/820,609, filed Mar. 19, 2019, which is hereby incorporated by reference in its entirety.

FIELD

This disclosure is directed towards an ionic liquid whose cation includes a cyclic phosphorus moiety and an electrolyte for electrochemical cells containing the ionic liquid.

BACKGROUND

Recent progress in synthesis and electrochemical analysis of room temperature ionic liquids (ILs) has established the promise of this unique class of materials as electrolytes for next-generation lithium-ion batteries. ILs are organic salts having melting points below 100° C. and generally consist of a bulky cation and an inorganic anion. The large cation size allows for delocalization and screening of charges, resulting in a reduction in the lattice energy and thereby the melting point or glass transition temperature. ILs have unique physicochemical properties, such as negligible vapor pressure, non-flammability, good room-temperature ionic conductivity, a wide electrochemical window, and favorable chemical and thermal stability. These properties are desirable for providing IL-based electrolytes for lithium batteries.

However, there are still safety challenges such as flammability of lithium-ion batteries under abuse conditions or even normal conditions. Chi-Cheung Su et al. teaches the use of an electrolyte composition containing cyclic phosphorus compounds, but mentions no use of an ionic liquid, or of an ionic liquid covalently bonded to a moiety comprising cyclic phosphorus moieties. Therefore, there is a need to incorporate a novel ionic liquid to impart flame retardant capabilities into lithium ion batteries. Also, there is a need to extend the operating voltage to extract more capacity from the Li ion cathodes. However, the current generation electrolytes are not stable above 4.2V.

SUMMARY

The present disclosure is directed towards an ionic liquid, including anions and cations, wherein the cations have at least one cyclic phosphorus moiety.

In accordance with one aspect of the present disclosure, there is provided an electrolyte for use in an electrical storage device, the electrolyte includes an aprotic organic solvent, a metal salt, a passivating additive and an ionic liquid compound that contains at least one cyclic phosphorus moiety.

In accordance with another aspect of the present disclosure, there is provided an electrolyte in an electrical energy storage device, the electrolyte includes an aprotic organic solvent, a metal salt, a passivating additive and an ionic liquid compound that contains at least one cyclic phosphorus moiety, wherein the organic solvent is open-chain or cyclic carbonates, carboxylic acid esters, nitrites, ethers, sulfones, sulfoxides, ketones, lactones, dioxolanes, glymes, crown ethers, siloxanes, phosphoric acid esters, phosphates, phosphites, mono- or polyphosphazenes or mixtures thereof.

In accordance with another aspect of the present disclosure, there is provided an electrolyte in an electrical energy storage device, the electrolyte includes an aprotic organic solvent, a metal salt, a passivating additive and the ionic liquid compound that contains at least one cyclic phosphorus moiety, wherein the cation of the metal salt is lithium, sodium, aluminum or magnesium. The metal salt can be an alkali metal salt or alkaline earth metal salt.

In accordance with another aspect of the present disclosure, there is provided an electrolyte in an electrical energy storage device, the electrolyte including an aprotic organic solvent, a metal salt, a passivating additive and an ionic liquid compound that contains at least one cyclic phosphorus moiety, wherein the passivating additive contains sulfur-containing compounds, phosphorus-containing compounds, boron-containing compounds, silicon-containing compounds, compounds containing at least one unsaturated carbon-carbon bond, carboxylic acid anhydrides or mixtures thereof.

These and other aspects of the present disclosure will become apparent upon a review of the following detailed description and the claims appended thereto.

DETAILED DESCRIPTION

The present disclosure is directed towards an ionic liquid compound including at least one cation and at least one anion, wherein the at least one cation is covalently bonded to at least one cyclic phosphorus moiety.

In an embodiment, an electrical energy storage device electrolyte includes a) an aprotic organic solvent system; b) a metal salt; c) a passivating additive; and d) an ionic liquid compound including at least one cation and an at least one anion, wherein at least one cation is covalently bonded to at least one cyclic phosphorus moiety.

In an embodiment, an ionic liquid compound includes an anion; and a cation attached to a cyclic phosphorus moiety according to the formula A or B:

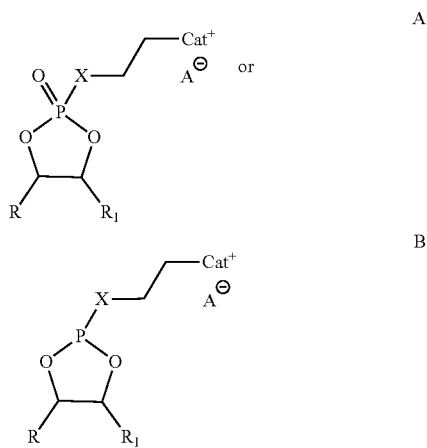

wherein:

CAT$^+$ is a pyrrolidinium, piperdinium, azepanium, onium, sulfonium, phosphonium, imidazolium, pyridine or a 5- or 6-membered heterocyclic ring having 1 to 3 heteroatoms as ring members including nitrogen, oxygen, silicon or sulfur;

R and $R_1$ are independently a Hydrogen, $C_1$-$C_8$ alkyl, perfluoro alkyls, alkenyl, alkoxy, aryl, alkynyl, alkylsiloxy, phenyl, benzyl, silyl, thioether, sulfoxide, azo, amino or silane group, wherein any of the carbon or hydrogen atoms therein are optionally further substituted with a halide, alkyl, alkenyl, alkoxy, aryl, alkynyl, alkylsiloxy, phenyl, benzyl, silyl, thioether, sulfoxide, azo, amino or silane; and X is (a) a linker, including a $C_1$-$C_8$ alkyl, alkenyl, alkynyl, alkoxy, ester, carbonyl, phenyl, thioether, sulfoxide, azo or aryl group, wherein any of the carbon or hydrogen atoms therein are optionally further substituted with a halide; (b) O, S, N, or C; or (c) O, S, N, or C attached to the linker.

Suitable anions (A$^-$) in accordance with the present disclosure, include but are not limited to halides (e.g., Cl, Br), nitrates (e.g., $NO_3$), phosphates (e.g., $PF_6$, TFOP), imides (e.g., TFSI, BETI), borates (e.g., BOB, $BF_4$), aluminates, arsenides, cyanides, thiocyanates, nitrites, benzoates, carbonates, chlorates, chlorites, chromates, sulfates, sulfites, silicates, thiosulfates, chalcogenides, pnictogenides, crystallogenides, oxalates, acetates, formates, or hydroxides.

The disclosure further includes a method for synthesizing the cyclic phosphorus moiety-based cations, and the use of such functionalized cations in an ionic liquid for electrochemical cells. These compounds afford the electrolyte greater thermal stability Suitable electrolyte metal salts include an alkali metal salt or alkaline earth metal salt. In an embodiment, the cation of the alkali metal salt includes lithium or sodium. In an embodiment, the cation of the metal salt includes aluminum or magnesium.

In some embodiments, the electrolyte includes a lithium salt in addition to the ionic liquid. A variety of lithium salts may be used, including, for example, $Li[CF_3CO_2]$; $Li[C_2F_5CO_2]$; $Li[ClO_4]$; $Li[BF_4]$; $Li[AsF_6]$; $Li[PF_6]$; $Li[PF_2(C_2O_4)_2]$; $Li[PF_4C_2O_4]$; $Li[CF_3SO_3]$; $Li[N(CP_3SO_2)_2]$; $Li[C(CF_3SO_2)_3]$; $Li[N(SO_2C_2F_5)_2]$; lithium alkyl fluorophosphates; $Li[B(C_2O_4)_2]$; $Li[BF_2C_2O_4]$; $Li_2[B_{12}Z_{12-j}H_j]$; $Li_2[B_{10}X_{10-j'}H_{j'}]$; or a mixture of any two or more thereof, wherein Z is independent at each occurrence a halogen, j is an integer from 0 to 12 and j' is an integer from 1 to 10.

In some applications of the present electrolyte, such as a formulation for a lithium ion battery, aprotic solvents are combined with the present ionic liquids to decrease the viscosity and increase the conductivity of the electrolyte. The most appropriate aprotic solvents lack exchangeable protons, including cyclic carbonic acid esters, linear carbonic acid esters, phosphoric acid esters, oligoether substituted siloxanes/silanes, cyclic ethers, chain ethers, lactone compounds, chain esters, nitrile compounds, amide compounds, sulfone compounds, siloxanes, phosphoric acid esters, phosphates, phosphites, mono- or polyphosphazenes and the like. These solvents may be used singly, or at least two of them in admixture.

Suitable aprotic organic solvents include open-chain or cyclic carbonates, carboxylic acid esters, nitriles, ethers, sulfones, ketones, lactones, dioxolanes, glymes, crown ethers, siloxanes, phosphoric acid esters, phosphites, mono- or polyphosphazenes or mixtures thereof.

Examples of aprotic solvents or carriers for forming the electrolyte systems include but are not limited to dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., fluorinated oligomers, methyl propionate, ethyl propionate, butyl propionate, dimethoxyethane, triglyme, dimethylvinylene carbonate, tetraethyleneglycol, dimethyl ether, polyethylene glycols, triphenyl phosphate, tributyl phosphate, hexafluorocyclotriphosphazene, 2-Ethoxy-2,4,4,6,6-pentafluoro-1,3,5,2-5,4-5,6-5 triazatriphosphinine, triphenyl phosphite, sulfolane, dimethyl sulfoxide, ethyl methyl sulfone, ethylvinyl sulfone, allyl methyl sulfone, divinyl sulfone, fluorophynelmethyl sulfone and gamma-butyrolactone.

In some embodiments, the electrolytes further include an additive to protect the electrodes from degradation. Thus, electrolytes of the present technology may include an additive that is reduced or polymerized on the surface of a negative electrode to form a passivation film on the surface of the negative electrode. Likewise, electrolytes can include an additive that can be oxidized or polymerized on the surface of the positive electrode to form a passivation film on the surface of the positive electrode. In some embodiments, electrolytes of the present technology further include mixtures of the two types of additives.

In some embodiments, an additive is a substituted or unsubstituted linear, branched or cyclic hydrocarbon including at least one oxygen atom and at least one aryl, alkenyl or alkynyl group. The passivating film formed from such additives may also be formed from a substituted aryl compound or a substituted or unsubstituted heteroaryl compound where the additive includes at least one oxygen atom. Alternatively, a combination of two additives may be used. In some such embodiments, one ion and the other additive can be selective for passivating the anode surface to prevent or lessen the reduction of metal ions at the anode.

Suitable passivating additives include sulfur-containing compounds, phosphorus-containing compounds, boron-containing compounds, silicon-containing compounds, fluorine-containing compounds, nitrogen-containing compounds, compounds containing at least one unsaturated carbon-carbon bond, carboxylic acid anhydrides or the mixtures thereof.

Representative additives include glyoxal bis(diallyl acetal), tetra(ethylene glycol) divinyl ether, 1,3,5-triallyl-1,3,5-triazine-2,4,6(1H,3H,5H)-trione, 1,3,5,7-tetravinyl-1,3,5,7-tetramethylcyclotetrasiloxane, 2,4,6-triallyloxy-1,3,5-triazine, 1,3,5-triacryloylhexahydro-1,3,5-triazine, 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2-amino-3-vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2-vinyloxetane, 2-vinyloxy-cyclopropanone, 3-(N-vinylamino)cyclohexanone, 3,5-divinyl furoate, 3-vinylazetidin-2-one, 3 vinylaziridin-2-one, 3-vinylcyclobutanone, 3-vinylcyclopentanone, 3-vinyloxaziridine, 3-vinyloxetane, 3-vinylpyrrolidin-2-one, 2-vinyl-1,3-dioxolane, acrolein diethyl acetal, acrolein dimethyl acetal, 4,4-divinyl-3-dioxolan-2-one, 4-vinyltetrahydropyran, 5-vinylpiperidin-3-one, allylglycidyl ether, butadiene monoxide, butyl-vinyl-ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, β-vinyl-γ-butyrolactone or a mixture of any two or more thereof. In some embodiments, the additive may be a cyclotriphosphazene that is substituted with F, alkyloxy, alkenyloxy, aryloxy, methoxy, allyloxy groups or combinations thereof. For example, the additive may be a (divinyl)-(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy)cyclotriphosphazene or (diaryloxy)(trifluoro)(methoxy)cyclotriphosphazene compounds or a mixture of two or more such compounds. In some embodiments, the additive is vinyl ethylene carbonate, vinyl carbonate, or 1,2-diphenyl ether, or a mixture of any two or more such compounds.

Other representative additives include compounds with phenyl, naphthyl, anthracenyl, pyrrolyl, oxazolyl, furanyl, indolyl, carbazolyl, imidazolyl, thiophenyl, fluorinated carbonates, sultone, sulfide, anhydride, silane, siloxy, phosphate or phosphite groups. For example, additives may be phenyl trifluoromethyl sulfide, fluoroethylene carbonate, 1,3,2-dioxathiolane 2,2-dioxide, 1-propene 1,3-sultone, 1,3-propanesultone, 1,3-dioxolan-2-one, 4-[(2,2,2-trifluoroethoxy)methyl], 1,3-dioxolan-2-one, 4-[[2,2,2-trifluoro-1-(trifluoromethyl)ethoxy]methyl]-, methyl 2,2,2-trifluoroethyl carbonate, nonafluorohexyltriethoxysilane, octamethyltrisiloxane, methyltris(trimethylsiloxy)silane, tetrakis(trimethylsiloxy)silane, (tridecafluoro-1,1,2,2-tetrahydrooctyl)triethoxysilane, tris(1H.1H-heptafluorobutyl)phosphate, 3,3,3-trifluoropropyltris(3,3,3-trifluoropropyldimethylsiloxy) silane, (3,3,3-trifluoropropyl)trimethoxysilane, trimethylsilyl trifluoromethanesulfonate, tris(trimethylsilyl) borate, tripropyl phosphate, bis(trimethylsilylmethyl)benzylamine, phenyltris(trimethylsiloxy)silane, 1,3-bis(trifluoropropyl)tetramethyldisiloxane, triphenyl phosphate, tris(trimethylsilyl)phosphate, tris(1H.1H,5H-octafluoropentyl) phosphate, triphenyl phosphite, trilauryl trithiophosphite, tris(2,4-di-tert-butylphenyl) phosphite, tri-p-tolyl phosphite, tris(2,2,3,3,3-pentafluoropropyl)phosphate, succinic anhydride, 1,5,2,4-dioxadithiane 2,2,4,4-tetraoxide, tripropyl trithiophosphate, aryloxypyrrole, aryloxy ethylene sulfate, aryloxy pyrazine, aryloxy-carbazole trivinylphosphate, aryloxy-ethyl-2-furoate, aryloxy-o-terphenyl, aryloxy-pyridazine, butyl-aryloxy-ether, divinyl diphenyl ether, (tetrahydrofuran-2-yl)-vinylamine, divinyl methoxybipyridine, methoxy-4-vinylbiphenyl, vinyl methoxy carbazole, vinyl methoxy piperidine, vinyl methoxypyrazine, vinyl methyl carbonate-allylanisole, vinyl pyridazine, 1-divinylimidazole, 3-vinyltetrahydrofuran, divinyl furan, divinyl methoxy furan, divinylpyrazine, vinyl methoxy imidazole, vinylmethoxy pyrrole, vinyl-tetrahydrofuran, 2,4-divinyl isooxazole, 3,4 divinyl-1-methyl pyrrole, aryloxyoxetane, aryloxy-phenyl carbonate, aryloxy-piperidine, aryloxy-tetrahydrofuran, 2-aryl-cyclopropanone, 2-diaryloxy-furoate, 4-allylanisole, aryloxy-carbazole, aryloxy-2-furoate, aryloxy-crotonate, aryloxy-cyclobutane, aryloxy-cyclopentanone, aryloxy-cyclopropanone, aryloxy-cycolophosphazene, aryloxy-ethylene silicate, aryloxy-ethylene sulfate, aryloxy-ethylene sulfite, aryloxy-imidazole, aryloxy-methacrylate, aryloxy-phosphate, aryloxy-pyrrole, aryloxyquinoline, diaryloxycyclotriphosphazene, diaryloxy ethylene carbonate, diaryloxy furan, diaryloxy methyl phosphate, diaryloxy-butyl carbonate, diaryloxy-crotonate, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl methoxydiphenyl ether, divinyl phenyl carbonate, methoxycarbazole, or 2,4-dimethyl-6-hydroxy-pyrimidine, vinyl methoxyquinoline, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o terphenyl, N-methyl pyrrole, naphthalene or a mixture of any two or more such compounds.

In an embodiment, the electrolyte of the present technology includes an aprotic gel polymer carrier/solvent. Suitable gel polymer carrier/solvents include polyethers, polyethylene oxides, polyimides, polyphosphazines, polyacrylonitriles, polysiloxanes, polyether grafted polysiloxanes, derivatives of the foregoing, copolymers of the foregoing, cross-linked and network structures of the foregoing, blends of the foregoing and the like, to which is added a suitable ionic electrolyte salt. Other gel-polymer carrier/solvents include those prepared from polymer matrices derived from polypropylene oxides, polysiloxanes, sulfonated polyimides, perfluorinated membranes (Nafion resins), divinyl polyethylene glycols, polyethylene glycol-bis-(methyl acrylates), polyethylene glycol-bis(methyl methacrylates), derivatives of the foregoing, copolymers of the foregoing and cross-linked and network structures of the foregoing.

The functional ionic liquids and the electrolytic solution containing the salt are high in electrical conductivity and solubility in organic solvents and are suitable for use as an electrolytic solution for electrochemical devices. Examples of electrochemical devices are electric double-layer capacitor, secondary batteries, solar cells of the pigment sensitizer type, electrochromic devices and condensers, and this list is not limitative. Especially suitable as electrochemical devices are electric double-layer capacitor and secondary batteries, such as a lithium ion battery.

In yet another aspect, an electrochemical device is provided that includes a cathode, an anode and an electrolyte including an ionic liquid as described herein. In one embodiment, the electrochemical device is a lithium secondary battery. In some embodiments, the secondary battery is a lithium battery, a lithium-ion battery, a lithium-sulfur battery, a lithium-air battery, a sodium ion battery or a magnesium battery. In some embodiments, the electrochemical device is an electrochemical cell, such as a capacitor. In some embodiments, the capacitor is an asymmetric capacitor or supercapacitor. In some embodiments, the electrochemical cell is a primary cell. In some embodiments, the primary cell is a lithium/$MnO_2$ battery or Li/poly(carbon monofluoride) battery. In some embodiments, the electrochemical cell is a solar cell.

Suitable cathodes include those such as, but not limited to, a lithium metal oxide, spinel, olivine, carbon-coated olivine, $LiFePO_4$, $LiCoO_2$, $LiNiO_2$, $LiNi_xCo_yMet_zO_2$, $LiMn_{0.5}Ni_{0.5}O_2$, $LiMn_{0.3}Co_{0.3}Ni_{0.3}O_2$, $LiMn_2O_4$, $LiFeO_2$, $Li_{1+x}Ni_\alpha Mn_\beta Co_\gamma Met'_\delta O_{2-z'}F_{z'}$, $A_nB_2(XO_4)_3$ (NASICON), vanadium oxide, lithium peroxide, sulfur, polysulfide, a lithium carbon monofluoride (also known as LiCFx) or mixtures of any two or more thereof, where Met is Al, Mg, Ti, B, Ga, Si, Mn or Co; Met' is Mg, Zn, Al, Ga, B, Zr or Ti; A is Li, Ag, Cu, Na, Mn, Fe, Co, Ni, Cu or Zn; B is Ti, V, Cr, Fe or Zr; X is P, S, Si, W or Mo; and wherein $0 \leq x \leq 0.3$, $0 \leq y \leq 0.5$, $0 \leq z \leq 0.5$, $0 \leq x' \leq 0.4$, $0 \leq \alpha \leq 1$, $0 \leq \beta \leq 1$, $0 \leq \gamma \leq 1$, $0 \leq \delta \leq 0.4$, $0 \leq z' \leq 0.4$ and $0 \leq n \leq 3$. According to some embodiments, the spinel is a spinel manganese oxide with the formula of $Li_{1+x}Mn_{2-z}Met'''_yO_{4-m}X'_n$, wherein Met''' is Al, Mg, Ti, B, Ga, Si, Ni or Co; X' is S or F; and wherein $0 \le x \le 0.3$, $0 \le y \le 0.5$, $0 \le z \le 0.5$, $0 \le m \le 0.5$ and $0 \le n \le 0.5$. In other embodiments, the olivine has a formula of $Li_{1+x}Fe_{1z}Met''_yPO_{4-m}X'_n$, wherein Met'' is Al, Mg, Ti, B, Ga, Si, Ni, Mn or Co; X' is S or F; and wherein $0 \le x \le 0.3$, $0 \le y \le 0.5$, $0 \le z \le 0.5$, $0 \le m \le 0.5$ and $0 \le n \le 0.5$.

Suitable anodes include those such as lithium metal, graphitic materials, amorphous carbon, $Li_4Ti_5O_{12}$, tin alloys, silicon alloys, intermetallic compounds or mixtures of any two or more such materials. Suitable graphitic materials include natural graphite, artificial graphite, graphitized meso-carbon microbeads (MCMB) and graphite fibers, as well as any amorphous carbon materials. In some embodiments, the anode and cathode are separated from each other by a porous separator.

The separator for the lithium battery often is a microporous polymer film. Examples of polymers for forming films include nylon, cellulose, nitrocellulose, polysulfone, polyacrylonitrile, polyvinylidene fluoride, polypropylene, polyethylene, polybutene, or co-polymers or blends of any two or more such polymers. In some instances, the separator is an electron beam-treated micro-porous polyolefin separator. The electron treatment can improve the deformation temperature of the separator and can accordingly enhance the high temperature performance of the separator. Additionally, or alternatively, the separator can be a shut-down separator. The shut-down separator can have a trigger temperature above about 130° C. to permit the electrochemical cells to operate at temperatures up to about 130° C.

Example—Synthesis of Pyr12O-DOP PF6

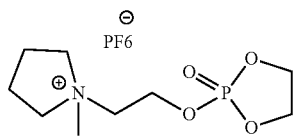

Step 1:

To a 100 mL 3-neck round bottom flask (RBF) equipped with a stir bar, a thermocouple, a water-cooled condenser, and nitrogen inlet, was placed 2-Chloro-1,3,2-dioxaphospholane 2-oxide in 18 mL tetrahydrofuran (THF). The flask was placed in an ice-water bath and the interior flask temperature was kept below 4° C. Triethylamine (Et3N) in 5 ml THF was then added to the flask. While stirring in the ice-water bath, 1-(2-Hydroxyethyl)pyrrolidine in 5 mL THF was added to the mixture and an exotherm to 20° C. was monitored. Some white solid was formed while the reaction mixture was stirred in the ice-water bath for 30 min. The mixture was slowly warmed up to room temperature and was stirred for 4 hours. The produced byproduct was filtered off and the filtrate was concentrated on a rotavapor.

Step 2: Quaternization

The filtrate was then added to an RBF with 10 mL of dichloromethane (DCM). Methyl iodide in 4 mL of DCM was added to this flask by pipette. The reaction mixture turned cloudy and a pale yellow oil was formed. The mixture was allowed to stir overnight at room temperature. The DCM layer was decanted and the remaining yellow oil was washed with DCM twice. The oil was concentrated on a rotavapor.

The following proton NMR (DMSO, 500 MHz) peaks were recorded on the oil.

$H^+$ NMR: (DMSO, 500 MHz) δ ppm 4.54 (br, 2H), 4.32 (br, 2H), 3.82-3.81 (m, 2H), 3.61-3.56 (m, 4H), 3.10-3.09 (m, 3H), 2.13 (br, 4H).

Step 3: Metathesis

The oil was added to a 100 mL RBF containing 10 mL water, followed by an aqueous solution of potassium hexafluorophosphate. When the two solutions were combined, a white, cloudy suspension quickly formed, and a yellow oil mass deposited on the bottom of the bottle. The reaction mixture was stirred at room temperature for 1.5 hours. The aqueous layer was decanted.

The crude oil was washed with more DCM twice and was dried under high vacuum for several hours. What remained is Pyr12O-DOP PF6.

The following proton, fluorine, and phosphorus NMR (DMSO, 500 MHz) peaks were recorded on Pyr12O-DOP PF6:

$H^+$ NMR: (DMSO, 500 MHz) δ ppm 4.50 (m, 2H), 4.28-4.27 (m, 2H), 3.73 (br, 2H), 3.56-3.50 (m, 4H), 3.06 (s, 3H), 2.12 (br, 4H).

$F^{19}$ NMR: (DMSO) δ ppm −69.38(s), −70.89(s).

$P^{31}$ NMR: (DMSO) δ ppm −1.81(s), −133.67(s), −137.18(s), −140.69(s), −147.72(s), −151.24(s), −154.75(s).

The following FTIR peaks were recorded as well:

FTIR: 3644.70; 1265.18; 1069.14, 1022.90, 986.34; 825.11; 555.23 $cm^{-1}$.

Although various embodiments have been depicted and described in detail herein, it will be apparent to those skilled in the relevant art that various modifications, additions, substitutions and the like can be made without departing from the spirit of the disclosure and these are therefore considered to be within the scope of the disclosure as defined in the claims which follow.

What is claimed:

1. An ionic liquid compound, comprising:
   an anion; and
   a cation attached to a cyclic phosphorus moiety according to the formula A or B:

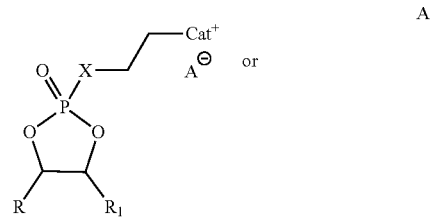

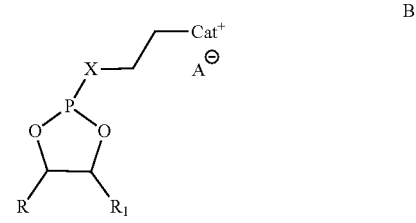

wherein:
   CAT$^+$ is a pyrrolidinium, piperdinium, azepanium, onium, imidazolium, pyridine or a 5- or 6-membered heterocyclic ring having 1 to 3 heteroatoms as ring members including nitrogen, oxygen, silicon or sulfur;

R and $R_1$ are independently a hydrogen, $C_1$-$C_8$ alkyl, perfluoro alkyls, alkenyl, alkoxy, aryl, alkynyl, alkylsiloxy, phenyl, benzyl, silyl, thioether, sulfoxide, azo, amino or silane group, wherein any of the carbon or hydrogen atoms therein are optionally further substituted with a halide, alkyl, alkenyl, alkoxy, aryl, alkynyl, alkylsiloxy, phenyl, benzyl, silyl, thioether, sulfoxide, azo, amino or silane;

X is (a) a linker, including a $C_1$-$C_8$ alkylene, alkenylene, alkynylene, alkyleneoxy, ester, carbonyl, phenyl, thioether, sulfoxide, azo or aryl group, wherein any of the carbon or hydrogen atoms therein are optionally further substituted with a halide; (b) O or S; or (c) O or S attached to the linker; and $A^-$ is an anion, including halides, nitrates, phosphates, imides, borates, aluminates, arsenides, cyanides, thiocyanates, nitrites, benzoates, carbonates, chlorates, chlorites, chromates, sulfates, sulfites, silicates, thiosulfates, chalcogenides, pnictogenides, crystallogenides, oxalates, acetates, formates or hydroxides.

2. The compound of claim 1, wherein the anion comprises a halide, aluminates, arsenides, cyanides, thiocyanates, nitrites, benzoates, chlorates, chlorites, chromates, sulfates, sulfites, silicates, thiosulfates, oxalates, acetates, formates, hydroxides, nitrate, phosphate, imide, or borate.

3. The compound of claim 1, wherein the onium is sulfonium or phosphonium.

4. An electrical energy storage device electrolyte comprising:
   a) an aprotic organic solvent system;
   b) a metal salt;
   c) a passivating additive; and
   d) an ionic liquid compound according to claim 1.

5. The electrolyte of claim 4, wherein the anion comprises a halide, aluminates, arsenides, cyanides, thiocyanates, nitrites, benzoates, chlorates, chlorites, chromates, sulfates, sulfites, silicates, thiosulfates, oxalates, acetates, formates, hydroxides, nitrate, phosphate, imide, or borate.

6. The electrolyte of claim 4, wherein the aprotic organic solvent comprises open-chain or cyclic carbonates, carboxylic acid esters, nitrites, ethers, sulfones, ketones, lactones, dioxolanes, glymes, crown ethers, siloxanes, phosphoric acid esters, phosphites, mono- or polyphosphazenes or mixtures thereof.

7. The electrolyte of claim 4, wherein the metal salt comprises an alkali metal salt or alkaline earth metal salt.

8. The electrolyte of claim 7, wherein the cation of the alkali metal salt comprises lithium or sodium.

9. The electrolyte of claim 4, wherein the cation of the metal salt comprises aluminum or magnesium.

10. The electrolyte of claim 4, wherein the passivating additive comprises sulfur-containing compounds, phosphorus-containing compounds, boron-containing compounds, silicon-containing compounds, fluorine-containing compounds, nitrogen-containing compounds, compounds containing at least one unsaturated carbon-carbon bond, carboxylic acid anhydrides or the mixtures thereof.

* * * * *